United States Patent

[11] 3,620,927

[72] Inventor William W. Leathen
         Wexford, Pa.
[21] Appl. No. 836,945
[22] Filed June 26, 1969
[45] Patented Nov. 16, 1971
[73] Assignee Gulf Research & Development Company
         Pittsburgh, Pa.
         Continuation-in-part of application Ser. No.
         645,470, June 12, 1967, now abandoned.
         This application June 26, 1969, Ser. No.
         836,945

[54] CULTIVATION OF MICRO-ORGANISMS ON HYDROCARBONS
     13 Claims, No Drawings
[52] U.S. Cl. .................................................... 195/82,
                                                 195/28 R, 195/93
[51] Int. Cl. ........................................... C12c 11/00
[50] Field of Search .......................................... 195/3, 28,
                                                       82; 99/9, 96

[56] References Cited
     UNITED STATES PATENTS
     3,264,196  8/1966  Filose ........................... 195/82

Primary Examiner—A. Louis Monacell
Assistant Examiner—Seymour Rand
Attorneys—Meyer Neishloss, Dean E. Keith and William H. Deitch ABSTRACT: Protein concentrates are obtained in a process which includes:
1. Cultivating a hydrocarbon-consuming micro-organism in the presence of an aqueous nutrient medium, a hydrocarbon and a gas containing free oxygen;
2. recovering from "1." a micro-organism containing a small amount of hydrocarbon as a contaminant;
3. contacting the hydrocarbon-contaminated micro-organism from "2." at a temperature below that which supports active fermentation of the micro-organism with an aqueous nutrient medium and a gas containing free oxygen in the absence of added hydrocarbon; and
4. recovering from "3." a micro-organism substantially free from contaminating hydrocarbon, the micro-organism thus recovered having a higher protein content that that of the hydrocarbon-contaminated micro-organims.

CULTIVATION OF MICRO-ORGANISMS ON HYDROCARBONS

This application is a continuation-in-part of my copending application Ser. No. 645,470 filed June 12, 1967, now abandoned and assigned to the same assignees as the present application.

This invention relates to a process for cultivating micro-organisms on hydrocarbons and more particularly to the recovery of micro-organisms which are substantially free from the hydrocarbon used in the substrate on which they are grown.

Critical food shortages for both animals and humans in some parts of the world is a problem of growing concern. The use of fertilizers and improved farming techniques have greatly increased crop return per acre of cultivated ground. While increased crop yields has resulted in more food for more people throughout the world, there are still an alarming number of people who are suffering from malnutrition. To alleviate malnutrition, protein and vitamin food supplements have been developed for both animal and human consumption. Protein concentrates for food supplements that are commercially available includes fish meal, peanut meal, cottonseed meal, soybean meal and micro-organisms such as bacteria, molds, yeasts and the like.

Micro-organisms, because of their high rate of multiplication, have received much attention as a source of high quality protein. The ability of micro-organisms to metabolize carbohydrates is well known. It is equally well known, however, that carbohydrates are relatively expensive raw materials if the desired end product is a relatively inexpensive micro-organism. Because of the abundance of relatively inexpensive crude oil deposits, a considerable amount of experimental work has been conducted utilizing hydrocarbons derived from petroleum as the sole source of carbon for the growth of micro-organisms. A number of micro-organisms have been found to grow on petroleum substrates varying from normally gaseous hydrocarbons through normally liquid hydrocarbons and hydrocarbons that are solid under normal atmospheric conditions. One difficulty which is encountered in cultivating a micro-organism on a petroleum hydrocarbon or mixture of hydrocarbons is the recovery of a micro-organism which is free from any absorbed or adsorbed hydrocarbons.

In the past, various means have been employed in attempting to recover a micro-organism which is substantially free from the hydrocarbon substrate. According to one method as disclosed in U.S. Pat. No. 3,186,922 which was issued on June 1, 1965 to Alfred Champagnat, the hydrocarbon-contaminated micro-organism is admixed with a surface active agent, centrifuged and then washed in several stages with water. According to another method as disclosed in U.S. Pat. No. 3,268,419 which was issued on Aug. 23, 1966 to Alfred Champagnat and Bernard Laine, the micro-organism which is contaminated with a hydrocarbon is treated in a first extraction stage with a polar solvent such as ethanol or isopropanol and in a second extraction stage with a hydrocarbon solvent such as hexane or an azetropic mixture of hexane with isopropanol or ethanol. According to a further method as disclosed in U.S. Pat. No. 3,264,196 which was issued on Aug. 2, 1966 to Jean Antoine Filosa, the micro-organism which is contaminated with hydrocarbon is admixed with aqueous nutrient medium and maintained under normal active fermenting conditions in the present of a gas containing free oxygen but in the absence of added hydrocarbon. Fermentation is continued until the hydrocarbon has been substantially depleted.

In accordance with the present invention a process is provided wherein a hydrocarbon-contaminated micro-organism is subjected to a maturation stage during which the hydrocarbon contaminant is greatly reduced or eliminated while simultaneously increasing the yield of product, increasing the protein content of the product and decreasing the amount of ash which is normally formed if the fermentation is continued under normal active fermenting conditions. In the maturation stage, the hydrocarbon-contaminated micro-organism is contacted with a gas containing free oxygen in the presence of an aqueous nutrient medium in the absence of added hydrocarbon at a temperature below the temperature normally employed during the active fermentation stage of the process. Maturation of the micro-organism can be conducted in the fermentation vessel or, if desired, the micro-organism containing the hydrocarbon contaminant can be separated from the fermentation mass and thereafter contacted in a separate vessel with a gas containing free oxygen in the presence of aqueous nutrient medium.

I have found that a micro-organism which is substantially free from a hydrocarbon contaminant can be obtained in a process which comprises cultivating a hydrocarbon-consuming micro-organism at a temperature of about 25° to about 40° C. in the presence of an aqueous nutrient medium, a hydrocarbon and a gas containing free oxygen; recovering a micro-organism containing a small amount of hydrocarbon as a contaminant; contacting the hydrocarbon-contaminated micro-organism at a temperature below that which supports active fermentation of the micro-organism with an aqueous nutrient medium and a gas containing free oxygen in the absence of added hydrocarbon whereby there is obtained an increased yield of micro-organism substantially free from , contaminating hydrocarbon, the micro-organism substantially free from the contaminating hydrocarbon, the micro-organism thus obtained also having an increased protein content. The actual temperature at which maturation is conducted in accordance with the process of the invention depends somewhat upon the particular micro-organism being cultured and upon the nutrient medium employed. If the micro-organism is actively cultivated at about 25° the maturation should be effected at a temperature below 25° C. and preferably at a temperature within the range of about 10° to about 20°. If the micro-organism is actively cultivated at about 35° C., the maturation should be effected at a temperature below 35° C. If the micro-organism is actively cultivated at about 40° C., the maturation should be effected at a temperature below 40° C. It is preferred to effect maturation at a temperature which is 5° to 20° C. below the active fermentation temperature.

Adequate growth of a micro-organism requires not only a source of readily available carbon but also the presence of an aqueous nutrient medium. The aqueous nutrient medium which I employ will vary to some extent depending upon the type of micro-organism used and the type of hydrocarbon. In general, the nutrient medium comprises a mixture of mineral salts which furnish ions of ammonium, nitrate or nitrite, potassium, ferrous or ferric, calcium, magnesium phosphate, sulfate, as well as ions of trace elements including zinc, manganese, copper and molybdenum. Inasmuch as water is included in the nutrient mixture, many of the mineral salts can be incorporated into the substrate in sufficient quantity through the use of tap water. It is desirable, however, to add the salts to the mixture to insure their presence in sufficient quantity for growth of the micro-organism. The nutrient mixture consists primarily of water, which may constitute about 50 to 99 percent by weight or more of the total nutrient mixture. Generally, the water is employed in an amount normally used in microbial synthesis. A typical mineral salts medium for the growth of yeasts of a strain of *Candida tropicalis* has the following composition:

| | |
|---|---|
| Monopotassium hydrogen phosphate, $KH_2PO_4$ | 2.0 g. |
| Magnesium sulfate, $MgSO_4 \cdot 7H_2O$ | 1.0 g. |
| Sodium chloride, NaCl | 0.2 g. |
| Calcium chloride, $CaCl_2 \cdot 2H_2O$ | 0.2 g. |
| D-biotin | 5µ g. |
| Ammonium sulfate, $(NH_4)_2SO_4$ | 0.66 g. |
| Boric acid, $H_3BO_3$ | 1,000µ g. |
| Copper sulfate, $CuSO_4 \cdot 5H_2O$ | 80µ g. |
| Potassium iodide, KI | 200µ g. |
| Ferric chloride, $FeCl_3 \cdot 6H_2O$ | 400µ g. |
| Zinc sulfate, $ZnSO_4 \cdot 7H_2O$ | 800µ g. |
| Distilled water | 1,000 ml. |

Another typical mineral salts medium which can be used as a nutrient in the process of the invention has the following composition:

| | |
|---|---|
| Diammonium phosphate, (NH$_4$)$_2$HPO$_4$ | 1.3 g. |
| Monopotassium hydrogen phosphate, KH$_4$PO$_4$ | 1.3 g. |
| Magnesium sulfate, MgSO$_4$·7H$_2$O | 0.2 g. |
| Calcium chloride, CaCl$_2$·2H$_2$O | 0.02 g. |
| Ferric chloride, FeCl$_3$·6H$_2$O | trace |
| Yeast extract | 1.0 g. |
| Distilled water | 1,000 ml. |

A commercially available yeast nitrogen base medium "Difco" which can be used has the following typical composition:

| | |
|---|---|
| Nutrient Salts | |
| Ammonium sulfate (Nitrogen Source)$^a$ | 5 g. |
| Monopotassium hydrogen phosphate | 1 g. |
| Magnesium sulfate | 0.5 g. |
| Sodium chloride | 0.1 g. |
| Calcium chloride | 0.1 g. |
| Amino Acids$^a$ | |
| l-Histidine monohydrochloride | 10 mg. |
| dl-Methionine | 20 gm. |
| d dl-Tryptophan | 20 mg. |
| Vitamins | |
| Biotin | 2 µg. |
| Calcium pantothenate | 400 µg. |
| Folic acid | 2 µg. |
| Inositol | 2,000 µg. |
| Niacin | 400 µg. |
| p-Aminobenzoic acid (Difco) | 200 µg. |
| Pyridoxine hydrochloride | 400 µg. |
| Riboflavin | 200 µg. |
| Thiamine hydrochloride | 400 µg. | a. Medium may be supplied commercially without nitrogen source or amino acids.

| | |
|---|---|
| Compounds Supplying Trace Elements | |
| Boric acid | 500 µg. |
| Copper sulfate | 40 µg. |
| Potassium iodide | 100 µg. |
| Ferric chloride | 20 µg. |
| Manganese sulfate | 400 µg. |
| Sodium molybdate | 200 µg. |
| Zinc sulfate | 400 µg. |
| Distilled Water | 1 liter |

Micro-organisms which can be cultivated in the process of the invention are those which normally can assimilate carbon from hydrocarbons or those which have been adapted to assimilate carbon from hydrocarbons including molds, bacteria and yeasts. Typical examples of molds are those of the family Aspergillaceae, suitable genera of which are Penicillium and Aspergillus. Specific examples of molds within these genera are *Penicillium rocqueforti, Penicillium glaucum, Penicillium chrysogenum, Pencillium patulum, Penicillium notatum, Penicillium espansum, Aspergillus fumigatus, Aspergillus carbonarious, Aspergillus niger, Aspergillus flavus, Aspergillus tereus* and *Aspergillus versicolor*.

Bacteria which can be employed in the process of the invention are those within the group consisting of Pseudomonadales, Eubacteriales and Actinomycetales. The bacteria which are employed are preferably of the families Bacillaceae and Pseudomonadaceae, preferred species being *Bacillus megaterium, Bacillus subtilis* and *Pseudomonas aeruginosa*.

Yeasts which can be employed in the process of the invention are preferably those of the family Cryptococcaceae and especially of the sub-family Cryptococcoideae. Other yeasts can also be employed such as those of the family ascosporogeneous and especially of the sub-family Saccharomycoideae. Preferred genera of the Cryptococcoideae sub-family are *Torulopsis* and *Candida*. Preferred strains of yeast are *Candida utilis, Candida rugosa, Candida lipolytica, Candida tropicalis* and *Torulopsis colliculosa*. Of these yeasts, a strain of *Candida tropicalis* is preferred, particularly *Candida tropicalis*, strain CS-8-17 which has been isolated from petroleum-soaked soils. *Candida tropicalis*, strain CS-8-17 has been deposited in and is available from the American Type Culture Collection in Rockville, Md. This strain has been assigned the ATCC number 20021. The advantage of utilizing a micro-organism which has been isolated from an oil-soaked soil is that the organism is already adapted to metabolize hydrocarbons so that an initial hydrocarbon-adaptation procedure is not necessary. If the micro-organism, particularly yeast, has been grown in a carbohydrate environment, it is usually necessary to adapt the organism to grow on carbon supplied by the hydrocarbon. This procedure may require a prolonged period of time. Even yeasts which have been isolated from oil-soaked soil may require an adaptation procedure to adapt the yeast to grow on the particular hydrocarbon which is intended to be used as feedstock in the fermentation process.

The hydrocarbon which is utilized as the source of carbon for the micro-organism is a saturated or unsaturated aliphatic hydrocarbon having up to 30 or more carbon atoms per molecule. A preferred hydrocarbon feedstock is a petroleum fraction, especially a petroleum fraction consisting essentially of a mixture of straight chain hydrocarbons. The straight chain hydrocarbons can be present as olefins, paraffins or a mixture containing both olefins, and paraffins. Examples of individual hydrocarbons which can be used are n-pentane, 1-pentene, n-hexane, 1 hexene, n-heptane, 1-heptene, n-octane, n-decane, 1-decene, n-dodecane, 1-dodecane, n-tetradecane, 1-tetradecene, n-hexacdecane, n-octadecane, n-eicosane n-tetracosane, n-triacontane and the like. Those hydrocarbons which are liquid at the fermentation conditions employed are preferred. While the individual hydrocarbons can be used, I prefer, for economic reasons to use mixtures of hydrocarbons. Thus, I may use kerosene, gas oil, middle distillate fractions, slack wax and the like. Good results have been obtained with hydrocarbon mixtures comprising naphtha ($C_6$–$C_{13}$), n-paraffins ($C_9$–$C_{13}$), n-paraffins ($C_{14}$–$C_{17}$), alpha olefins ($C_{10}$–$C_{16}$), kerosene ($C_9$–$C_{16}$), and slack wax ($C_{17}$–$C_{29}$), alone and in admixture with naphtha. The amount of hydrocarbon employed is that amount required to provide sufficient carbon to support growth of the micro-organism during the fermentation period. All the hydrocarbon can be added at the beginning of the fermentation period, but I prefer to add the hydrocarbon in increments as the fermentation proceeds. It is preferred to employ only that amount required to effect desired growth in order to avoid a prolonged maturation period at the conclusion of the normal active fermentation period. In general the amount of hydrocarbon comprises about 1 to 10 percent by weight of the fermentation mass (brew), preferred amounts for most favorable growth of Candida tropicalis (CS-8-17) being about 3 to about 5 percent by weight.

Inasmuch as micro-organisms in the cultivation stage of the process are made up of living cells, their growth, as is true with other living organisms, depends upon an adequate supply of carbon, hydrogen, oxygen, nitrogen and trace amounts of other elements including sodium, potassium, magnesium and iron. Carbon is required for growth and energy. Nitrogen is required for synthesis of protein and other nitrogenous materials. Other elements are required for mineral structure of the cell. In the present process, carbon and hydrogen are supplied by the hydrocarbon; oxygen is supplied by the introduction of air; and nitrogen is supplied through the use of ammonium or other nitrogenous inorganic salts in the nutrient medium. Trace quantities of other elements necessary for growth of the micro-organism may be supplied as impurities in the inorganic salts or these elements maybe added directly in extremely small amounts. Frequently, sufficient quantities of the trace elements are present in tap water.

The growth of the micro-organisms can be improved by the addition of known growth stimulators such as extracts of malt and yeast autolysates. Malt extract contains a high concentration of carbohydrate which initiates rapid growth of the micro-organism. Malt extract is obtained by extracting the water-soluble portion from sprouted grain and then evaporating the extract to dryness at low temperature to conserve the nitrogenous and carbohydrate constituents. Yeast extracts are the water-soluble portions of yeast concentrated by a process which preserves the thermolabile constituents, including amino acids, nicotinic acid and riboflavin, along with traces of metals. Yeasts autolysates are produced by enzymatic hydrolysis and conserve all of the amino acids present in the original protein. Such autolysates contain high levels of total nitrogen, amino nitrogen, peptones, peptides and B-complex vitamins. Biotin is an important component in yeast extracts. All of the materials in solution in the nutrient medium in which the micro-organism is grown are taken into the cell by diffusion through a semipermeable membrane, i.e., the cell wall. Insoluble materials, and possibly larger molecules of the soluble substances, are transported across the membrane by complex enzyme systems. The amount of the growth stimulator employed comprises about 0.1 to about 1.0 percent by weight (dry) based on the weight of the fermentation mass (brew), a preferred amount when employing Candida tropicalis (CS-8-17) being about 0.1 percent by weight.

All micro-organisms metabolize carbon-containing substances to increase in size and to reproduce. Assimilation, an endothermic reaction, consists of the process whereby the cells of micro-organisms are constructed from nutritive substances present in the environment, whereas dissimilation, an exothermic reaction, consists of the decomposition of transformation of the substrate of yield energy for use by the organism. The sum of these two processes, metabolism, may be considered as the chemical changes in living cells by which energy is provided for vital processes and new material is assimilated to repair damage. In these processes, respiration, or the absorption of oxygen and the liberation of carbon dioxide and the formation of acidic substances, principally fatty acids, occur. The net effect of these processes is a reduction of the pH of the aqueous nutrient medium. Thus, to prevent a buildup of acidity which adversely affects the growth of the micro-organism, it is essential to add an alkaline material to restore the pH of the aqueous nutrient medium to a desired level. If the pH is not maintained at a desired level, the growth of the micro-organism ceases, that is cellular density no longer increases so that a stationary growth phase is encountered.

The optimum pH of the aqueous nutrient medium depends somewhat upon the nature of the substrate and the particular micro-organism being cultured. The pH is usually within the range of about 1.5 to about 8. With mineral salt substrates, the optimum pH for most yeast cultures if a pH of about 7. When employing a yeast nitrogen base substrate, optimum growth for a yeast nitrogen base substrate, optimum growth for a yeast of the strain of Candida tropicalis occurs at a pH of about 3 to 5, a pH of about 3 being preferred. While optimum ranges of pH for molds is also within the range of about 3 to 5, bacteria usually requires a higher pH in the order of about 6 to 8. In order to maintain the pH at any desired level, I may add to the aqueous nutrient medium, either continuously or in separate increments, any suitable alkaline material such as sodium hydroxide, potassium hydroxide, disodium hydrogen phosphate, ammonium hydroxide and ammonia.

The optimum temperature for the growth of the micro-organism is dependent upon the particular organism employed but will usually be within the range of about 25° to about 40° C. When using a strain of Candida tropicalis the preferred temperature range is about 25° to about 35° C.

Oxygen, as disclosed hereinabove, is one of the essential elements required to promote the growth of the micro-organism. While pure oxygen can be employed, I prefer for economic reasons to supply the oxygen as air. In order to effect an optimum growth of the micro-organism, the air should be finely sparged through the substrate along with agitation at a rate sufficient to form a vortex in the liquid. Depending upon the design of the fermentor, various air spargers can be used including single orifice, half and full ring types with openings for air discharge directed upwardly and/or downwardly, and sintered glass percolator types with various impellers for lifting air. Impellers, when employed, can be rotated at rates from 200 to 1,000 r.p.m. or more, the particular rate being chosen to create a vortex in the liquid. Regardless of the type of sparger employed, operation should be such as to avoid excessive foaming since foaming tends to entrap the micro-organism and remove it from the source of soluble nutrients required in its growth. While the amount of air employed depends somewhat on the size and design of the fermentor, good results are obtained in 14-liter fermentor jars containing 7 liters of brew when employing sterile air at rates of 2 to 10 liters per minute.

Typically, a micro-organisms grow in the fermentation period in a characteristics growth pattern which may be designated as follows:

1. Initial stationary phase—In this phase, the number of micro-organisms remains constant.
2. Lag phase—During this period, the rate of multiplication increases with time.
3. Logarithmic growth phase—The rate of multiplication remains constant; the generation time is the same throughout the period.
4. Negative growth phase—During this phase, the rate of multiplication decreases and the average generation time increases. The organisms continue to increase in number, but at a slower rate than during the logarithmic phase.
5. Maximum station phase—The number of living organisms remains constant, i.e., the death rate equal the rate of reproduction.
6. Accelerated death phase—The number of micro-organisms declines with increasing rapidity. The average rate of death increases to a maximum.
7. Logarithmic death phase—In this period, the rate of death is constant.

According to the present invention active fermentation is interrupted at the end of the logarithmic growth phase and subjected to a maturation treatment at a temperature below that which supports active fermentation. During the maturation treatment, the hydrocarbon is greatly reduced or eliminated while the yield of product is increased, the protein content of the product is increased and the amount of ash which is normally formed if fermentation is not discontinued at this point is decreased. Maturation as disclosed hereinabove is effected at a temperature below the temperature at which active fermentation is conducted.

At the conclusion of the maturation phase in the process of the invention, the product is separated from the nutrient medium by centrifuging and then washed one to three times with tape water and finally dried under conditions sufficiently mild to avoid autolysis but under conditions sufficiently severe to assure recovery of a nonviable micro-organism containing not more than about 10 percent moisture, usually about 3 to about 5 percent moisture. With bacteria, the drying temperature may be as high as 100° C. The drying temperature for most yeasts to insure the recovery of nonviable cells in an oven is within the range of about 50° to about 75° C. If spray drying is employed, the temperature of the dryer may be in the order of about 150° C. without adversely affecting the quality of the yeast. In drying a strain of Candida tropicalis, I have recovered nonviable cells by employing a drying temperature of 60° C. in an oven.

In order to illustrate the improved results obtained in accordance with the process of the invention, comparative examples are set forth wherein maturation in example I is effected at a temperature below the active fermentation temperature and maturation in Example II is effected at the active fermentation temperature In the comparative examples, I have utilized a Candida tropicalis strain of yeast, i.e., Candida tropicalis, strain CS-8-17. This yeast was isolated through an enrichment culture procedure from oil-soaked soil adjacent to operating oil wells located in Pennsylvania. The micro-organism was characterized and identified in accordance with the classification in "The Yeasts" by J. Lodder and N. J. W. Kreger-Van Rij, North Holland Publishing Co., Amsterdam, 1952, Interscience Publishers, Inc., New York. The micro-organism was found to be identical in all physiological characteristics with *Candida tropicalis* (ATCC 1410) obtained from the American Type Culture Collection, Washington, DC Morphologically, the micro-organism which I isolated was similar to *Candida tropicalis* (ATCC 1410), differing primarily in cell size. The cells of the strains of *Candida tropicalis* (CS-8-A17) were smaller than the cells in the type culture. Examination of colonies of the strain of Candida tropicalis (CS-8-7) which I isolated are large, white, opaque, raised and smooth. While the strain of *Candida tropicalis* (CS-8-17) which I isolated appeared physiologically to be the same as *Candida tropicalis* (ATCC 1410the *Candida tropicalis* obtained from the American Type Culture Collection could not readily be adapted to sustained growth in a mineral salt nutrient medium containing $C_{10}$-$C_{15}$ n-paraffins as the sole source of carbon. I believe that *Candida tropicalis* (ATCC 1410) could become acclimatized to hydrocarbon assimilation if the feeding technique were gradual and over a long period of time. My theory in this respect is based upon my belief that the normal microbial flora of the soil becomes acclimated to the utilization of hydrocarbons from long residence in oil-saturated soil.

Example I is an illustration of the process of the invention. It should be understood that example I is by way of illustration only and is not intended to limit the scope of the invention. Example II is for comparison purposes and is not a process of the invention.

EXAMPLE I

Seven liters of an aqueous mineral nutrient medium are introduced into a 14-liter Pyrex glass fermentor jar equipped with a stainless steel head assembly. The head assembly contains ports for the addition of nutrients and removal of samples, an agitator shaft, an air sparger line, baffles and a thermometer well. The nutrient medium introduced into the fermentor has the following composition:

| | |
|---|---|
| Monopotassium hydrogen phosphate $KH_2PO_4$ | 2.0 g. |
| Magnesium sulfate, $MgSO_4 \cdot 7H_2O$ | 1.0 g. |
| Sodium chloride, NaCl | 0.2 g. |
| Calcium chloride, $CaCl_2 \cdot 2H_2O$ | 0.2 g. |
| D-biotin | 5 µg. |
| Ammonium sulfate, $(NH_4)_2SO_4$ | 0.66 g. |
| Boric acid, $H_3BO_3$ | 1,000 µg. |
| Copper sulfate, $CuSO_4 \cdot 5H_2O$ | 80 µg. |
| Potassium iodide, KI | 200 µg. |
| Ferric chloride, $FeCl_3 \cdot 6H_2O$ | 400 µg. |
| Zinc sulfate, $ZnSO_4 \cdot 7H_2O$ | 800 µg. |
| Distilled water | 1,000 ml. |

The fermentor is placed in a water bath which is adjusted to maintain the fermentation medium at 29°±1° C. The fermentor is equipped with impellers connected to a drive mechanism capable of rotating the impellers at rates up to 1,000 r.p.m. The air which is introduced into the fermentor through the sparger is passed through a stainless steel filter tube packed with Pyrex glass wool to remove any particles of dust as well as any airborne micro-organisms.

The fermentor which contains the 7 liters of nutrient medium is then inoculated with 25 grams of wet (73 percent moisture) yeast of the strain *Candida tropicalis* (CS-8-17) The cellular density of the yeast in the fermentor is thus about 6.75 g. of dry matter per 7 liters or about 1 g. per liter.

The strain of *Candida tropicalis* (CS-8-17) used in this example is retained as stock culture in a stationary conditions at 25° C. on a medium consisting of 97 percent by volume of a commercially available yeast nitrogen base medium ("Difco") and 3 percent by volume of hydrocarbon mixture comprising 93.7 percent by weight of $C_9$-$C_{13}$ normal paraffins, the normal paraffin distribution being substantially as follows:

| n-Paraffin | Weight Percent |
|---|---|
| $C_9$ | trace |
| $C_{10}$ | 6.8 |
| $C_{11}$ | 35.2 |
| $C_{12}$ | 32.1 |
| $C_{13}$ | 25.8 |

Active Fermentation is conducted for 15 hours at 29°±1° C. with an aeration rate of about 5 liters per minute at impeller speeds of 500 to 900 r.p.m. During this 15-hour period a total of 88.7 ml. of the above-described $C_9$-$C_{13}$ n-paraffin mixture are added in about 6 ml. increments at hourly intervals. During the first 3 hours of active fermentation, a total of 4.3 ml. of an aqueous solution of ammonium sulfate containing 47.88 mg. of nitrogen per ml. is added in about 1.5 ml. increments. At hourly intervals during the next 12 hours of active fermentation, a total of 55 ml. of ammonium hydroxide containing about 50 mg. of nitrogen per ml. is added in about 4.5 ml. increments. The total amount of nitrogen added to the fermentor during the 15-hour period of active fermentation is about 3 grams. The pH of the fermentation mass is maintained at about 3 during the active fermentation by the addition of the ammonium hydroxide. At the end of the 15-hour active fermentation period the cellular density is about 7.2 g. of dry matter per liter, the protein content about 40.6 percent by weight, the ash about 12.7 percent by weight and the residual hydrocarbon about 0.03 ml. per 100 ml. of brew.

At the end of the active fermentation period, the fermentation mass (brew) without being removed from the fermentor is subjected to a 12-hour maturation period during which neither hydrocarbon nor nitrogen is added. The hydrocarbon remaining in the brew at the start of the maturation period comprises about 0.03 ml. of hydrocarbon per 100 ml. of brew. During the maturation period, the temperature of the brew is reduced below that which will support active fermentation, i.e., below about 25° C. In this example, the temperature during maturation is maintained at about 10° C. with an aeration rate of about 0.5 liter per minute at an impeller speed of about 450 r.p.m. to control foaming. A reduced aeration rate is employed to avoid excessive foaming. LA reduced impeller speed is employed to avoid possible disintegration of the cellular material. At the end of the 12-hour maturation period, only a trace of hydrocarbon remains in the brew, i.e., less than about 0.01 ml. of hydrocarbon per 100 ml. of brew. Yeast cells are harvested by centrifuging the brew to recover a yeast paste. The yeast paste is washed with water and centrifuged (usually about 3 times) until the desired purity is obtained. The wet yeast cells are then dried at a temperature less than about 100° C., i.e., about 60° C., to preserve the quality of the product. The moisture content of the dried product (*Candida tropicalis*, (CS-8-A17) is less than 10 percent by weight of the product The yield of product is 7.7 grams per liter, the protein content of the product is 43.8 percent by weight and the ash content is 13.8 percent by weight.

EXAMPLE II

The procedure of Example I is repeated except that the 12-hour maturation period is conducted under an active fermentation temperature of 29° ±1° C. with an agitation rate of 800 r.p.m. to control foaming. The yield of product after active fermentation and after the maturation period is 7.1 grams per liter. Thus, there was no increase in yield when maturation was effected at an active fermentation temperature. The protein content of the product after active fermentation is 41.0 percent; after maturation the protein content of the product is 43.3 percent, an increase of 2.3 percent. The ash content of the product after active fermentation is 12.7 percent; after maturation, the ash content of the product is 15 percent and increase of 2.3 percent.

The fermentation and maturation conditions of examples I AND II and the results obtained are summarized in Table I.

TABLE I

| Active Fermentation | EXAMPLE | |
|---|---|---|
| | I | II |
| Time, hrs. | 15 | 15 |
| Temperature, °C. | 29±1 | 29±1 |
| Aeration, l./m. | 5 | 5 |
| Agitation, r.p.m. | 500-900 | 500-900 |
| Product Data | | |

| | | |
|---|---|---|
| Yield (dry), g./l. | 7.2 | 7.1 |
| Protein, % by wt. | 40.6 | 41.0 |
| Ash, % by wt. | 12.7 | 12.7 |
| Residual hydrocarbon, ml./100 ml. brew | 0.03 | 0.04 |
| Maturation Period | | |
| Time, hrs. | 12 | 12 |
| Temperature, °C. | 10 | 29±1 |
| Aeration, l./m. | 0.5 | 0.5 |
| Agitation, r.p.m. | 450 | 800 |
| Product Data | | |
| Yield (dry), g./l. | 7.7 | 7.1 |
| Protein, % by wt. | 43.8 | 43.3 |
| Ash, % by wt. | 13.8 | 15.0 |
| Residual hydrocarbon ml./100 ml. brew | trace | 0.02 |
| Effect of Maturation | | |
| Increase in yield, g./l. | 0.5 | 0 |
| Increase in protein, % by wt. | 3.2 | 2.3 |
| Increase in ash, % by wt. | 1.1 | 2.3 |

The data in Table I show that maturation at a temperature below the active fermentation temperature gives an increased yield, an increase in protein content and a decrease in the amount of ash formed over that formed if maturation is effected at the active fermentation temperature. When the maturation is effected at 29°±1° C. the product yield is the same 7.1 grams per liter, that obtained at the end of the active fermentation period. While maturation at 29°±1°C. gives a product having an increased protein content, the increase is not as great as that obtained when maturation is effected at a temperature below the active fermentation temperature. It will be noted, further, that maturation at 29°±1° C. results in a product having a higher ash content and that the increase in ash content is more than twice the increase obtained when maturation is effected at 10° C.

The makeup of Candida tropicalis (CS-8-17) obtained in the process of the present invention may vary slightly from one fermentation to another. The yeast product will normally contain about 10 percent by weight of moisture and 90 percent by weight of dry matter. Typical analyses of the dry matter of the yeast product are as follows:

| | Candida tropicalis (CS-8-17) Percent by weight |
|---|---|
| Carbon | 48.2 |
| Hydrogen | 7.1 |
| Total nitrogen | 7.0 |
| Protein | 43.8 |
| Total ash | 13.8 |
| Phosphorus | 4.2 |
| Fat | 3.4 |
| Fiber | 3.8 |

Typical analyses for the amino acid distribution in the protein fraction of Candida tropicalis (CS-8-17) are as follows:

| Amino Acid | Candida tropicalis (CS-8-17) 17) Percent by weight of Protein fraction |
|---|---|
| Lysine | 8.85 |
| Histidine | 2.22 |
| Arginine | 5.24 |
| Aspartic Acid | 11.75 |
| Threonine | 6.77 |
| Serine | 6.25 |
| Glutamic Acid | 13.48 |
| Proline | 4.10 |
| Glycine | 4.93 |
| Alanine | 7.28 |
| Half-Cystine | Trace |
| Valine | 4.99 |
| Methionine | 1.49 |
| Isoleucine | 4.46 |
| Leucine | 8.10 |
| Tyrosine | 3.82 |
| Phenylalanine | 4.90 |
| Tryptophan | 1.37 |
| TOTAL | 100.00 |

While my invention has been described with reference to various specific examples and embodiments, it will be understood that the invention is not limited to such examples and embodiments and may be variously practiced within the scope of the claims hereinafter made.

1. A process which comprises cultivating a hydrocarbon-consuming yeast at an active fermentation temperature of about 25° to about 40° C. in the presence of an aqueous nutrient medium, a hydrocarbon and a gas containing free oxygen; recovering a yeast containing a small amount of hydrocarbon as a contaminant; contacting the hydrocarbon-contaminated yeast at a temperature which is 5° to 20° C. below the active fermentation temperature with an aqueous nutrient medium and a gas containing free oxygen in the absence of added hydrocarbon; and recovering an increased yield of yeast substantially free from the contaminating hydrocarbon, the yeast thus recovered having a higher protein content than that of the hydrocarbon-contaminated yeast.

2. A process according to claim 1 wherein the yeast is of the family Cryptococcaceae.

3. A process according to claim 1 wherein the hydrocarbon is a liquid petroleum fraction consisting essentially of a mixture of straight chain hydrocarbons.

4. A process according to claim 1 wherein the pH of the aqueous nutrient medium is within the range of about 1.5 to about 8.

5. A process according to claim 1 wherein the oxygen-containing gas is air.

6. A process according to claim 3 wherein the liquid petroleum fraction is a mixture of $C_9$ to $C_{13}$ normal paraffins.

7. A process according to claim 2 wherein the yeast is of the subfamily Cryptococcoideae.

8. A process according to claim 7 wherein the yeast is of the genus Candida.

9. A process according to claim 8 wherein the yeast is of the strain Candida tropicalis.

10. A process according to claim 9 wherein the yeast is Candida tropicalis, strain CS-8-17.

11. A process which comprises cultivating a hydrocarbon-consuming yeast at an active fermentation temperature of about 25° to about 40° C. in the presence of an aqueous nutrient medium, a hydrocarbon and a gas containing free oxygen; recovering a yeast containing a small amount of hydrocarbon as a contaminant; contacting the hydrocarbon-contaminated yeast at a temperature of about 10° to about 20° C. with an aqueous nutrient medium and a gas containing free oxygen in the absence of added hydrocarbon and recovering an increased yield of yeast substantially free from the contaminating hydrocarbon, the yeast thus recovered having a higher protein content than that of the hydrocarbon contaminated yeast.

12. A process which comprises cultivating a hydrocarbon-consuming yeast of the strain Candida tropicalis at a temperature of about 28° to about 30° C. in the presence of an aqueous nutrient medium whose pH is maintained within the range of about 3 to about 5, a hydrocarbon feedstock comprising a mixture of $C_9$ to $C_{13}$ normal paraffins and air; recovering a yeast of the strain Candida tropicalis containing a small amount of the hydrocarbon feedstock as a contaminant; contacting the hydrocarbon-contaminated yeast at a temperature of about 10° to about 20° C. with an aqueous nutrient medium whose pH is maintained within the range of about 3 to about 5 and air in the absence of added hydrocarbon feedstock; and recovering an increased yield of Candida tropicalis substantially free from the contaminating hydrocarbon, the Candida tropicalis thus recovered having a higher protein content than that of the hydrocarbon-contaminated yeast.

13. A process which comprises cultivating a hydrocarbon-consuming yeast of the strain Candida tropicalis at a temperature of about 28° to about 30° C. in the presence of an aqueous nutrient medium whose pH is maintained at about 3, a hydrocarbon feedstock comprising a mixture of $C_9$ to $C_{13}$ normal paraffins and air; recovering a yeast of the strain *Candida tropicalis* containing a small amount of the hydrocarbon feedstock as a contaminant; contacting the hydrocarbon-contaminated yeast at a temperature of about 10° to about 20° C. with an aqueous nutrient medium whose pH is maintained at about 3 and air in the absence of added hydrocarbon feedstock; and recovering an increased yield of *Candida tropicalis* substantially free from the contaminating hydrocarbon, the *Candida tropicalis* thus recovered having a higher protein content than that of the hydrocarbon-contaminated yeast.

* * * * *

PO-1050
(5/69)

UNITED STATES PATENT OFFICE
CERTIFICATE OF CORRECTION

Patent No. 3,620,927             Dated    November 16, 1971

Inventor(s) William W. Leathen

It is certified that error appears in the above-identified patent and that said Letters Patent are hereby corrected as shown below:

Last word in the Abstract, "micro-organims" should read
--micro-organism--.

Column 2, lines 24 and 25, "contaminating hydrocarbon, the
micro-organism substantially free from" should be deleted.

Column 3, under the heading "Amino Acids[a]", "ddl-Tryptophan"
should read --dl-Tryptophan--.

Column 4, line 26, "n-hexacdecane" should read --n-hexadecane--.

Column 5, line 1 after "of" and before "yeast" insert
--autolyzed--;

line 46, "if" should read --is--;

lines 48 and 49 "nitrogen base substrate, optimum
growth for a yeast" should be deleted.

Column 6, line 11, "a" should be deleted;

line 12, "characteristics" should read --characteristic line 27, "equal" should read --equals--.

Column 7, line 7, "(CS-8-A17)" should read --(CS-8-17)--;

line 63, "conditions" should read --condition--.

Column 8, line 33, "L" should be deleted.

Column 9, in Table I under the heading "Product Data" "Yield
(dry), g./." should be --Yield (dry), g/l--;

line 58, "(CS-8-17)17)" should read --(CS-8-17)--.

Signed and sealed this 23rd day of May 1972.

(SEAL)
Attest:

EDWARD M. FLETCHER, JR.             ROBERT GOTTSCHALK
Attesting Officer                     Commissioner of Patents